United States Patent Office 3,497,493
Patented Feb. 24, 1970

3,497,493
WATER-SOLUBLE CATIONIC METAL COMPLEXES OF FORMAZAN DYESTUFFS
Hans Grossmann, Oberwil, near Basel, Switzerland, assignor to Durand & Huguenin A.G., Basel, Switzerland, a Swiss corporation
No Drawing. Filed Oct. 4, 1966, Ser. No. 584,090
Int. Cl. C09b 45/28; D06f 3/70; A61k 7/12
U.S. Cl. 260—149
5 Claims

ABSTRACT OF THE DISCLOSURE

Water-soluble cationic formazan dyestuffs of the formula:

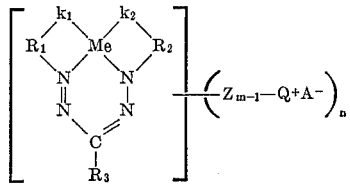

wherein:
- $k_1$ and $k_2$ each represent a complex forming group in O— position to the azo group selected from the group consisting of —O—, and —COO—;
- $R_1$ and $R_2$ represent a member selected from the group consisting of phenylene, nitrophenylene, chlorophenylene, naphthylene, nitronaphthylene, and chloronaphthylene.
- $R_3$ represents a member selected from the group consisting of cyano, acetyl, carbamyl, benzoyl, benzenesulfonyl, phenyl, toluyl, and nitro;
- Me is a heavy metal selected from the group consisting of Ag, Zn, Fe, Co, Cr, Ni and Cu;
- Z is a bridge member bonding Q to $R_1$, $R_2$ and $R_3$ and is selected from the group consisting of —CH$_2$,
  —CH$_2$—NHCOCH$_2$—NHCOCH$_2$—,
  —NHCOC$_2$H$_4$—, —SO$_2$NHC$_3$H$_6$—,
  —SO$_2$CH$_2$CH$_2$—, —COCH$_2$ and —SO$_2$CH$_2$—;
- Q$^+$ represents a member selected from the group consisting of trimethyl ammonio, triethylammonio, tri-n-propyl ammonio, dimethylethylammonio, dimethylbenzylammonio, diethyl cyano ethylammonio dimethylhydroxyethylammonio, pyridinio, N-methylmorpholinio, methylpiperidinio and dimethylcyclohexylammonio,
- A represents an anion selected from the group consisting of Cl$^-$, Br$^-$, SO$_3$CH$_3^-$ and CH$_3$C$_6$H$_4$SO$_3^-$;
- m is an integer from 1 to 2, and
- n is an integer from 1 to 3.

The present invention provides valuable new water-soluble metal complexes of formazan dyestuffs which are free from dissociatable acid groups not bound in complex union and which contain at least one quaternary ammonium group, and a process for their manufacture.

The dyestuffs of the invention are cationic metal complexes of formazan dyestuffs of the Formula I

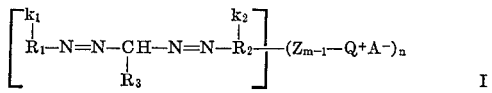

in which $k_1$ and $k_2$ represent complex-forming groups each of which is in ortho-position to the adjacent azo bridge, $R_1$ and $R_2$ represent arylene residues, $R_3$ represents a monovalent organic residue, Q$^+$ represents a quaternary ammonium group, A$^-$ represents an anion, Z represents a bridge member, n is the whole number 1, 2 or 3, and m is the whole number 1 or 2, the dyestuffs of the Formula I containing no further dissociatable acid groups, and the sum of n + the charge number of the metal being at least 4.

The substituents $R_1$ and $R_2$ are preferably phenylene residues, but they may be naphthylene residues, and they may contain substituents that are customary in dyestuffs chemistry, for example, halogen atoms or nitro groups or alkyl or alkoxy groups, which are free from further dissociatable acid groups.

Bridge members reprsented by Z are, for example,

—SO$_2$CH$_2$—, COCH$_2$—, —SO$_2$CH$_2$CH$_2$—,
—SO$_2$NH(CH$_2$)$_3$—, —NHCOCH$_2$CH$_2$—, but especially
—CH$_2$NHCOCH$_2$—, —NHCOCH$_2$— and —CH$_2$—.

As quaternary ammonium groups represented by Q$^+$ there are to be understood groups of the formula

in which $x_1$, $x_2$ and $x_3$ each represent a lower hydroxyalkyl, cyanoalkyl, aralkyl, halogen-alkyl or cycloalkyl residue, and especially a lower alkyl residue, and two or three of the said residues together with the nitrogen atom to which they are bound may form a monocyclic heterocyclic residue, for example, a pyridine or morpholine ring.

Complex-forming groups $k_1$ and $k_2$ are, for example, methylsulphonylamino groups, but preferably hydroxyl or carboxyl groups.

A$^-$ is to be understood as an anion imparting solubility in water. The anion may be of organic character, but is preferably of inorganic character as, for example, Cl$^-$, Br$^-$, SO$_3$CH$_3^-$ or CH$_3$C$_6$H$_4$SO$_3^-$.

The monovalent organic radical represented by $R_3$ is, for example, a nitro, alkyl, aryl, aralkyl, alkylsulphonyl, arylsulphonyl, alkoyl, aroyl, carbalkoxy or arylaminocarbonyl group. Of special interest, however, are metal complexes of formazan dyestuffs of the Formula I in which $R_3$ represents a phenyl, cyano or acetyl group.

The metal complexes of the invention may be obtained by various processes. The preferred process is to react metal-free formazan dyestuffs of the Formula I in known manner with metal-yielding compounds. Suitable metals are those capable of forming a tricyclic complex compound with dyestuffs of the Formula I, for example, Ag, Zn, Fe, Co, Cr and preferably Ni and Cu. Specially suitable metal-yielding compounds are metal salts of mineral acids or of lower fatty acids. However, there may also be used complex compounds of these metals of which a part of their complexly bound groups remain in the final product. When salts of mineral acids are used it is of advantage to carry out the reaction in the presence of an agent capable of binding acid, for example, in the presence of an alkali metal hydroxide, an alkali metal carbonate, an alkali metal acetate or an alkali metal formate or ammonia or a tertiary nitrogen base. The metal-yielding compound is used in at least an equimolecular proportion, that is to say, at least one atomic proportion of metal per molecular proportion of dyestuff. The metallization may be carried out in an organic solvent, for example, formamide or ethylene glycol. However, it is of advantage to carry out the metallization in an aqueous medium with or without an organic solvent.

The formazan dyestuffs of the Formula I used as starting materials may be prepared by methods in themselves known.

Thus, for example, diazo compounds derived from amines corresponding to the Formula II

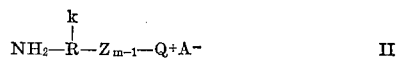

$$NH_2-R-Z_{m-1}-Q^+A^-$$  II may be used as starting materials, in which formula $k$ is in ortho-position to the amino group, and $k$ and $R$ have the meanings indicated above for $k_1$ and $k_2$ and for $R_1$ and $R_2$, respectively. Also suitable are diazo compounds which contain in ortho-position to the diazo group a substituent convertible into a complex-forming group at an appropriate stage in the process, for example, an acylated hydroxyl group or an acylated methylsulphonyl-amino group.

Suitable compounds of the Formula II are, for example,

4'-hydroxy-3'-aminophenyl-trimethylammonium chloride,
3' - hydroxy-4'-aminophenyl-triethylammonium chloride,
5'-methyl- or 5' - chloro- or 5' - nitro - 4' - hydroxy-3'-aminophenyl-trimethylammonium chloride,
trimethyl-, triethyl-, tri-n-propyl-, dimethyl-hydroxyethyl-, diethylcyano-ethyl- or dimethylethyl-ammonio-acetic acid (4'hydroxy-3'-aminophenylamide) chloride,
pyridinium-N-acetic acid (4' - hydroxy-3'-aminophenylamide) chloride,
methyl-piperidinium-N-acetic acid (4'-hydroxy-3'-aminophenylamide) chloride,
dimethylcyclohexylammonioacetic acid (4' - hydroxy-3'-aminophenylamide) chloride,
methylmorpholinium-N-acetic acid (4'-hydroxy-3'-aminophenylamide) chloride,
4'-hydroxy-3'-aminonaphthyl-(1') - trimethylammonium chloride,
4'-hydroxy-3'-aminobenzyl-trimethylammonium chloride,
4'-hydroxy-3'-aminobenzenesulphone-(3-trimethyl-ammoniumpropyl-1-amide) chloride,
trimethylammonioacetic acid (4'-hydroxy-3'-aminobenzylamide) chloride,
trimethylammonioacetic acid (4'-amino-3'-carboxyphenylamide) chloride,
pyridinium-N-acetic acid (4' - amino-3'-carboxy-phenylamide) chloride.

The formazan dyestuffs of the Formula I are preferably made by reacting 1 molecular proportion of a diazo compound containing a hydroxyl or carboxyl group in ortho-position to the diazo group and 1 molecular proportion of the diazo derivative of a compound of the Formula II in any desired sequence with 1 molecular proportion of a compound capable of coupling twice at the same carbon atom, if necessary, after an intermediate hydrolysis reaction. An especially advantageous form of the process consists in reacting 2 molecular proportions of the diazo derivative of a compound of the Formula II simultaneously or stepwise with the compound capable of coupling twice. The first coupling step is preferably carried out at a pH value of 5 to 9 and the second at a pH value of 9 to 12, the alkali used being, for example, sodium hydroxide solution, sodium carbonate, magnesium carbonate or magnesium hydroxide. Coupling is preferably carried out at a temperature within the range of from —5 to 35° C. If desired or required, a water-solubilising compound or organic solvent, for example, dimethyl-formamide, dioxane, chlorobenzene or pyridine, may be added to the coupling mixture.

Compounds capable of coupling twice at the same carbon atom are, for example, nitroalkanes, for example, nitromethane; cyclic or acyclic ketones, for example, cyclohexanone, acetone or acetophenone; diacyl-methanes, for example, acetylacetone or acetyltosylmethane; and also sulphonyl-acetic acids and derivatives thereof, 4' - methylphenyl-sulphonylacetic acid, cyanoacetic acid and derivatives thereof, for example, cyanoacetic acid esters or cyanoacetamide; carbonylacetic acids and derivatives thereof, for example, acetoacetic acid, acetoacetic acid esters, acetoacetamide benzoylacetic acid esters, oxalylacetic acid esters, phenylformylacetic acid esters or phenyloxalylacetic acid esters; or malonic acid esters.

When the carbon atom capable of coupling, that is present in the product of the first coupling operation, carries a substituent that cannot be eliminated by the second diazo compound, for example, an acetyl group or a carbalkoxy group, the said substituent is first converted by hydrolysis into a hydrogen atom or into an eliminatable substituent, for example, a carboxyl group. The hydrolysis is preferably carried out at a pH value of 8 to 13 and under conditions such that any quaternary ammonium groups present are not affected. In order to prevent oxidation reactions, the hydrolysis may be carried out in the presence of a reducing agent, for example, sulphite and glucose.

The compound capable of coupling twice and the process are so chosen that the residue $R_3$ in the resulting formazan dyestuff of the Formula I does contain no dissociatable acid substituents.

Another process for making formazan dyestuffs of the Formula I consists in diazotizing a compound of the Formula II and reacting the diazotized compound with ortho-hydroxy- or ortho-carboxy-phenyl-hydrazones which may contain a quaternary ammonium group. Aldehydes suitable for use in the preparation of the hydrazones are preferably the aromatic aldehydes that lead to the formation of arylformazans and are free from dissociatable acid groups, for example, benzaldehyde, 3-nitrobenzaldehyde, 4-chlorobenzaldehyde, 4-dimethylaminobenzaldehyde and 4 - trimethylammoniobenzaldehyde chloride. There may also be used heterocyclic aldehydes, for example, furfural, or aliphatic or araliphatic aldehydes, for example, acetaldehyde or phenyl-acetaldehyde. A hydrazine which is suitable for preparing the hydrazones is, for example, ortho-carboxyphenyl hydrazine and the substitution products thereof.

A special form of the process of the invention for making metal complexes of formazan dyestuffs of the Formula I consists in carrying out the metallization and the formation of the formazan dyestuff of the Formula I simultaneously. For example, the metal complexes of the invention can be obtained directly by coupling 2 molecular proportions of a diazotized compound of the Formula II with cyanoacetic acid, or 1 molecular proportion of a diazotized compound of the Formula II with the hydrolysed coupling product of 1 molecular proportion of an ortho-hydroxyaryldiazo compound and phenylformylacetic acid methylester in the presence of a metal-yielding compound as defined above, especially a compound yielding copper or nickel.

The invention also includes a modification of the above-mentioned process which consists in forming the quaternary ammonium groups after the metallization process. Thus, after carrying out the known process for making a cationic metal complex of an azo-dyestuff the resulting metal complex of a formazan of the Formula I, in which Q represents a quaternisable amino group, may be treated with an alkylating agent. Suitable alkylating agents are, for example, alkyl or aralkyl halides, for example, benzyl chloride; and aromatic sulphonic acid esters or neutral alkyl sulphates, for example, dimethyl sulphate.

However, it is also possible to convert metal complexes of formazan dyestuffs of the Formula I, in which Q represents a halogen-acylamino group, preferably a chloro- or bromoacetylamino group, into the corresponding complex metal quaternary ammonium compounds with the aid of tertiary amines, for example, trimethylamine or pyridine.

Finally, metal complexes of formazan dyestuffs of the Formula I, in which Q represents a primary or secondary amino group, may be reacted with acylating agents containing quaternary ammonium groups. Suitable acylating agents are, for example, the chloride of trimethylammonioacetyl chloride, the chloride of 2-trimethylammonioethane-(1)-sulphochloride and the chloride of 3-trimethylammoniobenzoyl chloride.

In order to ensure the solubility in water and the cationic character of the dyestuffs of the invention, the starting materials are so selected that the sum of the positive charges of the complex-forming metal ion and the number of quaternary ammonium groups is at least 4. Thus, when using compounds that yield divalent metal ions, such as copper or nickel, $n$ in Formula I must be at least 2. Of special interest are those metal complexes of formazan dyestuffs of the Formula I in which $n$ is 2.

The method by which the dyestuffs are isolated depends on the nature of the process used for making the dyestuffs. If the last step of the process is carried out in an organic solvent, the dyestuff can be isolated by filtration either directly or after the addition of a non-polar solvent, or by distillation of the solvent. When an aqueous medium is used, the isolation may be carried out by the addition of a water-soluble salt. Purification of the crude dyestuff may be effected by known methods. A specially advantageous method of purification consists in dissolving the dyestuff in water, removing insoluble starting material, including any by-products, by filtration and precipitating the dyestuff by the addition of a salt.

The new metal complexes of the formazan dyestuffs of Formula I dissolve in water to give violet, navy blue, blue, green, olive green, red-brown, brown or grey colorations, and are suitable for dyeing structures, such as fibres, flocks, filaments, spun yarns, woven fabrics and knitted fabrics, consisting of mordanted, for example, tannin-treated cotton, natural polyamides, for example, wool, silk, leather, furs and hairs, synthetic polyamides and other synthetic fibres, for example, polyurethanes, cellulose esters and polyesters. The dyestuffs are specially suitable for dyeing or printing materials made of polymers or copolymers of acrylonitrile and dicyanoethylene, for example, "Orlon" (registered trademark). Such dyeings are distinguished by their fast and deep tints.

Those derivatives that exhibit a good solubility in organic solvents are also suitable for colouring oils, lacquers and plastics, and for colouring in the mass fibres that are spun from organic solvents.

The dyestuffs are also of special interest for the dyeing of furs, and animal and human hair, especially living hair. In this application, they are distinguished by their high affinity at room temperature, their excellent penetrating power, their resistance to washing and to light, and their high degree of inertness to the skin. A large number of valuable shades that are currently fashionable can be produced by mixing the dyestuffs of the invention with known cationic dyestuffs.

The following examples illustrate the invention, the parts and percentages being by weight unless otherwise stated, and the relationship of parts by weight to parts by volume is the same as that of the kilogram to the litre:

EXAMPLE 1

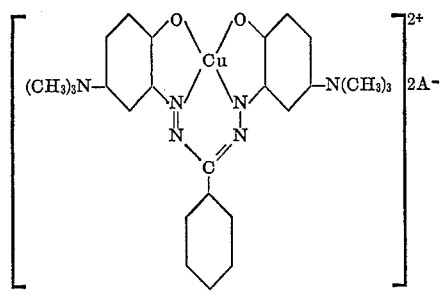

A solution of 6.9 parts of sodium nitrite in 20 parts of water is added dropwise at 0°C. to a solution of 20.3 parts of (4'-hydroxy-3'-aminophenyl)-trimethylammonium chloride and 30 parts by volume of concentrated hydrochloric acid in 150 parts of water. After neutralizing the excess hydrochloric acid with sodium bicarbonate, the diazo solution is added dropwise in the course of one hour to the following mixture, which is cooled to 0° C.: 19.2 parts of $a$-phenylformylacetic acid ethyl ester, 50 parts of water, 200 parts of dioxane, 140 parts by volume of 2 N-sodium carbonate solution and 12 parts by volume of 10 N-sodium hydroxide solution. At the same time 2 N-sodium carbonate solution is added to keep the mixture slightly alkaline to phenolphthalein. After the coupling, the pH of the yellow mixture is adjusted to 7 with concentrated hydrochloric acid, 60 parts by volume of 10 N-sodium hydroxide solution are added, the whole is boiled for 5 minutes under reflux, and then the pH of the mixture is again adjusted to 7 with concentrated hydrochloric acid. 25 parts of copper sulphate crystals and 30 parts of sodium carbonate are added at room temperature to the solution of the hydrazone so obtained. A neutralized diazo solution prepared from 20.3 parts of (4'-hydroxy - 3' - aminophenyl) - trimethylammonium chloride in the manner described above is then run in in the course of one hour, the blue copper complex of the formazan being formed immediately, and the whole is stirred until coupling is finished. The whole is neutralized with concentrated hydrochloric acid, 200 parts of water are added, an insoluble residue is isolated by filtration, the dyestuff which is formed is precipitated with sodium perchlorate, filtered off, and then purified in the usual manner by recrystallization from water.

The (4' - hydroxy - 3' - aminophenyl) - trimethylammonium chloride used in this example is obtained by the N-acetylation of 4-nitro-2-aminophenol, reduction of the nitro group, quaternation of the resulting amino group with dimethyl sulphate and acid hydrolysis of the acetylamino group.

The dyestuff so obtained very probably corresponds to the above formula. When dried, it is a dark violet powder; it dissolves in water to give a blue solution and in concentrated sulphuric acid to give a violet solution.

One part of this dyestuff is dissolved in 5,000 parts of water in the presence of 2 parts of acetic acid of 40% strength. 100 parts of a boiled out yarn of polyacrylonitrile staple fibres are entered into this dyebath at 60° C., the temperature is raised to 100% C. in the course of one hour, and dyeing is carried out for one hour at the boil. A blue dyeing possessing an excellent fastness to light is obtained.

2 parts of this dyestuff are dissolved in 1,000 parts of water in the presence of ammonia at a pH value of 9. Bleached human hair is treated with the solution for 30 minutes at 25° C. A deep blue dyeing that is fast to water and to washing is obtained. A similar dyeing is obtained with the use of an acetic acid solution or an alcoholic aqueous solution. The dyestuff solutions produce virtually no coloration on the skin.

A dyestuff that dyes haid greenish blue tints is obtained by using in this example for the second coupling a diazo solution prepared from 25.3 parts 4'-hydroxy-3'-aminonaphthyl-(1')-trimethylammonium chloride. A dyestuff which likewise dyes hair greenish blue tints is obtained by using for both coupling operations a diazo solution prepared from 24.8 parts of 5'-nitro-4'-hydroxy-3'-aminophenyl-trimethylammonium chloride.

EXAMPLE 2

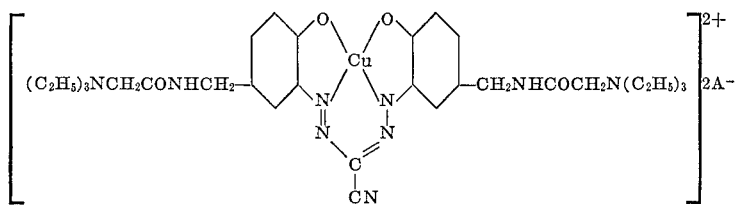

A mixture of 13.5 parts of copper sulphate crystals, 4.2 parts of cyanoacetic acid, 35 parts by volume of 10 N-sodium hydroxide solution and 150 parts of water is added in portions at 0° C. to a diazo solution prepared from 31.5 parts of triethylammonioacetic acid (4'-hydroxyl-3'-aminobenzylamide) chloride as described in Example 1 and neutralized as described therein.

After coupling, the dyestuff is precipitated by the addition of sodium perchlorate, filtered off, and purified by recrystallization from water.

The triethylammonioacetic acid (4'-hydroxy-3'-aminobenzylamide) chloride used in this example is obtained by the quaternization of triethylamine with 4-hydroxy-3-nitro-N-chloracetyl-benzylamine and reduction of the nitro group.

The dyestuff so obtained probably corresponds to the above formula. When dried, it is a black powder; it dissolves in water to give a violet solution, and in concentrated sulphuric acid to give a red solution. In dyes polyacrylonitrile fabrics, furs and hair bluish violet tints which are fast to light when applied by the process described in Example 1.

EXAMPLE 3

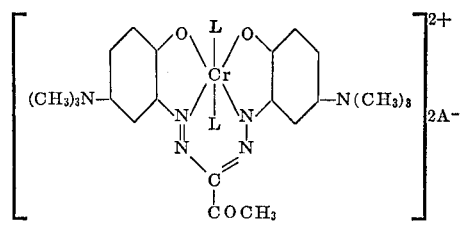

A diazo solution prepared from 40.6 parts of (4'-hydroxy-3'-aminophenyl)-trimethylammonium chloride as described in Example 1 and neutralized as described therein is added at 0° C. to a solution of 12.5 parts of potassium acetylacetate and 40 parts of sodium carbonate in 100 parts of water. After coupling, the solution is rendered slightly acid with acetic acid, a chromium acetate solution containing 5.2 parts of chromium is added, and the whole is boiled under reflux until the chroming process is finished. The dyestuff is precipitated by means of sodium perchlorate and is purified by recrystallization from water.

The dyestuff so obtained probably corresponds to the above formula, in which L represents a monovalent ligand. When dried, it is a black powder. It dissolves in water to give an olive-brown solution, and in concentrated sulphuric acid to give a brown-red solution. It dyes human hair olive-brown tints when applied in the manner described in Example 1.

EXAMPLE 4

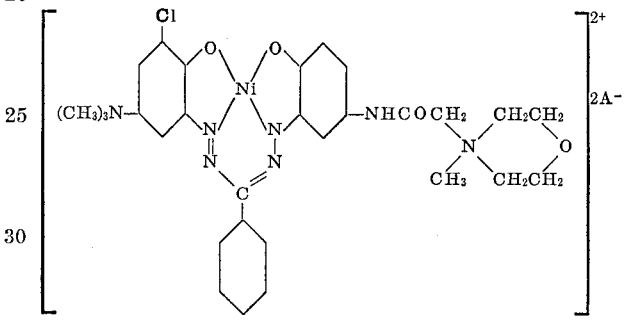

28.1 parts of nickel sulphate crystals and 35 parts of sodium carbonate are added at room temperature to a neutral solution of the hydrazone prepared as described in Example 1 from 23.7 parts of (5'-chloro-4'-hydroxy-3'-aminophenyl)-trimethylammonium chloride and 19.2 parts of α-phenylacetic acid ethyl ester. A diazo solution prepared from 30.2 parts of methylmorpholinium-N-acetic acid (4'-hydroxy-3'-aminophenylamide) chloride, and which has been adjusted to pH 4 with sodium bicarbonate, is run in in the course of one hour. After coupling, the nickel complex is isolated, purified and dried as described in Example 1.

The dyestuff so obtained probably corresponds to the above formula. It is a dark powder that dissolves in water to give a violet solution.

3 parts of this dyestuff are pasted in 5 parts of thiodiethylene glycol, the mixture is dissolved with 4 parts af acetic acid and 23 parts of water, and the solution is stirred into 65 parts of a thickening agent. The printing paste so prepared is printed on a polyacrylonitrile fabric. After being steamed for 30 minutes, the print is finished in the usual manner. A violet print having a very good fastness to light is obtained.

The methylmorphonilinium-N-acetic acid (4'-hydroxy-3'-aminophenyl-amide) chloride used in this example is obtained by the quaternization of N-methyl-morpholine with 4-chloroacetylamino-2-nitrophenol and reduction of the nitro group.

EXAMPLE 5

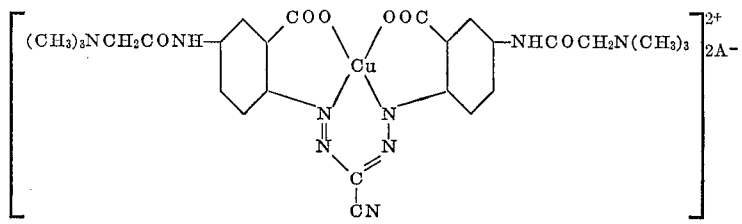

An aqueous solution of 6.9 parts of sodium nitrite is run into an ice-cold hydrochloric acid solution of 28.8 parts of trimethyl-ammonioacetic acid (4'-amino-3'-carboxylphenylamide) chloride in 300 parts of water. The excess of hydrochloric acid is neutralized with sodium bicarbonate, and the diazo solution is added at 0° C. to a solution of 3.6 parts of cyano-acetic acid and 50 parts by volume of 10 N-sodium hydroxide solution in 400 parts of water. The brownish red formazan dyestuff is formed immediately. After coupling, a solution of 12 parts of copper sulphate crystals in 80 parts of water is added dropwise, the whole is heated for 30 minutes at 90° C., and the copper complex is precipitated by the addition of sodium chloride, isolated by filtration and dried.

The dyestuff so obtained probably corresponds to the above formula. It is a dark powder that dissolves in water to give a violet solution, and in concentrated sulphuric acid to give a red-violet solution. It dyes human hair violet tints when applied in an ammoniacal solution as described in Example 1.

The trimethylammonioacetic acid (4'-amino-3'-carboxyphenylamide) chloride used in this example is obtained by the quaternization of trimethylamine with 5-chloracetylamino-2-nitrobenzoic acid and reduction of the nitro group.

EXAMPLE 6

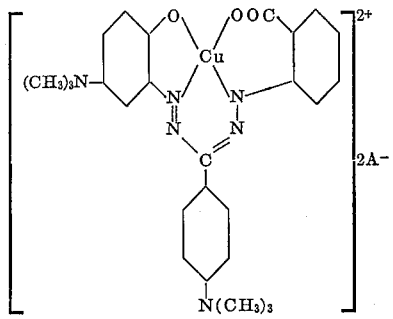

15.2 parts of ortho-carboxyphenyl-hydrazine are dissolved at 80° C. in 400 parts of water, and the solution is mixed with a weakly alkaline solution of 20 parts of 4-trimethylammoniobenzaldehyde hydrochloride in 200 parts of water. The solution of the resulting hydrazone is adjusted to pH with 10 N-sodium hydroxide solution, and cooled to 0 to 5° C. by the addition of ice. A neutralized diazo solution prepared from 20.3 parts of (4' - hydroxy - 3' - aminophenyl)-trimethylammonium chloride as described in Example 1 is then run in. As soon as the coupling is finished, the solution of the resulting formazan dyestuff is rendered neutral with acetic acid. 20 parts of cupric acetate are added, and the whole is heated for one hour at 90°. The copper complex of the formazan is isolated in the usual manner and purified by crystallization from water.

The dyestuff so prepared very probably corresponds to the above formula. It dissolves in water and in concentrated sulphuric acid to give blue solutions having a slight reddish cast, and dyes human hair blue tints that are fast to washing when applied in the manner described in Example 1.

In the following table are listed further examples of metal complexes of formazan dyestuffs that are obtainable by the processes described in the preceding examples:

TABLE

Metal complex of the dyestuff of the formula

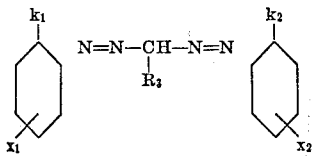

| Example | $x_1$ and $x_2$ | $k_1$ and $k_2$ | $R_3$ | Metal | Tint |
|---|---|---|---|---|---|
| 7 | $x_1/x_2$: 5-N$^+$(CH$_3$)$_3$ | $k_1/k_2$: HO— | C$_6$H$_5$— | Ni | Violet. |
| 8 | $x_1/x_2$: 4-N$^+$(C$_2$H$_5$)$_3$ | $k_1/k_2$: HO— | C$_6$H$_5$— | Cu | Blue. |
| 9 | $x_1/x_2$: 4-N$^+$(C$_2$H$_5$)$_3$ | $k_1/k_2$: HO— | C$_6$H$_5$— | Ni | Violet. |
| 10 | $x_1/x_2$: 5-SO$_2$NHC$_3$H$_6$N$^+$(CH$_3$)$_2$(CH$_2$C$_6$H$_5$) | $k_1/k_2$: HO— | C$_6$H$_5$— | Cu | Blue. |
| 11 | $x_1$: 5-N$^+$(CH$_3$)$_3$<br>$x_2$: 4-NHCOCH$_2$N$^+$(CH$_3$)$_3$ | $k_1$: HO—<br>$k_2$: HOOC— | CN— | Cu | Violet. |
| 12 | $x_1/x_2$: 5-NHCOCH$_2$N$^+$(C$_6$H$_5$)$_3$ | $k_1/k_2$: HO— | C$_6$H$_5$— | Cu | Blue. |
| 13 | $x_1/x_2$: 5-N$^+$(CH$_3$)$_3$ | $k_1/k_2$: HO— | 3-CH$_3$C$_6$H$_4$— | Cu | Do. |
| 14 | $x_1/x_2$: 5-CH$_2$N$^+$(CH$_3$)$_3$ | $k_1/k_2$: HO— | CH$_3$CO— | Co | Brown-violet. |
| 15 | $x_1/x_2$: 5-CH$_2$NHCOCH$_2$N$^+$(CH$_3$)$_2$(C$_2$H$_4$OH) | $k_1/k_2$: HO— | C$_6$H$_5$CO— | Cr | Grey. |
| 16 | $x_1/x_2$: 5-N$^+$(CH$_3$)$_3$ | $k_1/k_2$: HO— | NH$_2$CO— | Cu | Violet. |
| 17 | $x_1/x_2$: 5-N$^+$(CH$_3$)$_3$ | $k_1/k_2$: HO— | C$_6$H$_5$SO$_2$— | Cu | Grey-blue. |
| 18 | $x_1/x_2$: 5-NHCOCH$_2$N$^+$(CH$_3$)$_3$ | $k_1/k_2$: HOOC— | CN— | Co | Green. |
| 19 | $x_1/x_2$: 5-NHCOC$_2$H$_4$N$^+$(CH$_3$)$_3$ | $k_1/k_2$: HO— | C$_6$H$_5$— | Ni | Violet. |
| 20 | $x_1$: 5-N$^+$(CH$_3$)$_3$<br>$x_2$: 4-NHCOCH$_2$N$^+$(CH$_3$)$_3$ | $k_1$: HO—<br>$k_2$: HOOC— | H-(CH$_3$)$_3$N$^+$C$_6$H$_4$- | Cu | Reddish blue. |
| 21 | $x_1$: 5-N$^+$(CH$_3$)$_3$<br>$x_2$: 4-NO$_2$ | $k_1/k_2$: HO— | CH$_3$CO— | Co | Brown-violet. |

I claim:
1. Water-soluble cationic formazan dyestuffs of the formula:

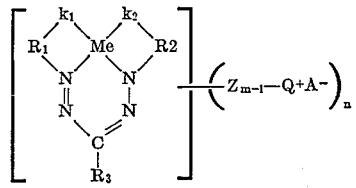

wherein:
$k_1$ and $k_2$ each represent a complex forming group in O— position to the azo group selected from the group consisting of —O—, and —COO—;

R$_1$ and R$_2$ represent a member selected from the group consisting of phenylene, nitrophenylene, chlorophenylene, naphthylene, nitronaphthylene, and chloronaphthylene, R$_3$ represents a member selected from the group consisting of cyano, acetyl, carbamyl, benzoyl, benzenesulfonyl, phenyl, toluyl, and nitro;

Me is a heavy metal selected from the group consisting of Ag, Zn, Fe, Co, Cr, Ni and Cu;

Z is a bridge member bonding Q to R$_1$, R$_2$ and R$_3$ and is selected from the group consisting of —CH$_2$, —CH$_2$—NHCOCH$_2$—NHCOCH$_2$—,
—NHCOC$_2$H$_4$—, —SO$_2$NHC$_3$H$_6$—
—SO$_2$CH$_2$CH$_2$—, —COCH$_2$ and SO$_2$CH$_2$—;

Q$^+$ represents a member selected from the group consisting of trimethyl ammonio, triethylammonio, tri-n-propyl ammonio, dimethylethylammonio, dimethylbenzylammonio, diethyl cyano ethylammonio dimethylhydroxyethylammonio, pyridino, N-methylmorpholinio, methylpiperidino and dimethylcyclohexylammonio, A represents an anion selected from the group consisting of $Cl^-$, $Br^-$, $SO_3CH_3^-$ and $CH_3C_6H_4SO_3^-$;

$m$ is an integer from 1 to 2, and $n$ is an integer from 1 to 3.

2. The dyestuff of claim 1 wherein $m=1$.

3. The water-soluble cationic formazan dyestuff of the formula

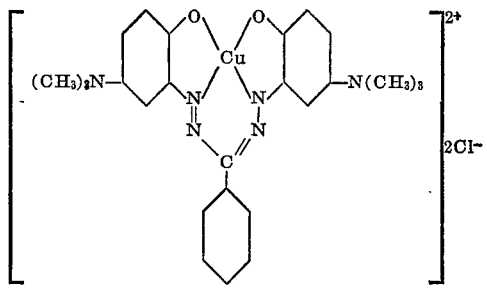

4. The water-soluble cationic formazan dyestuff of the formula

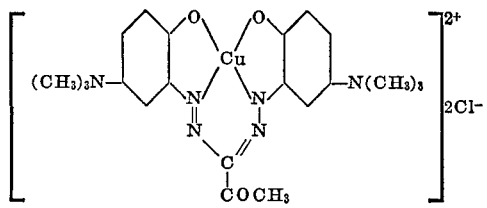

5. The water-soluble cationic formazan dyestuff of the formula

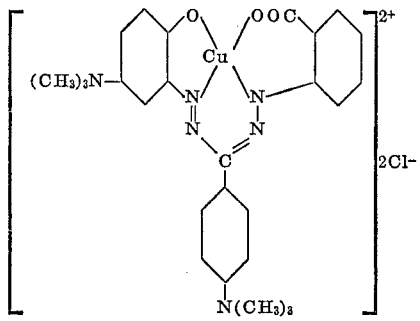

References Cited

UNITED STATES PATENTS 3,041,328   6/1962   Kraus et al. _____ 260—148 X

CHARLES B. PARKER, Primary Examiner

DONALD M. PAPUGA, Assistant Examiner

U.S. Cl. X.R.

8—10, 13, 41, 54, 55; 260—37, 146, 148, 152, 186, 247.2, 294, 295, 556, 562